Jan. 1, 1957 G. A. LYON 2,776,170
WHEEL COVER
Filed July 15, 1954
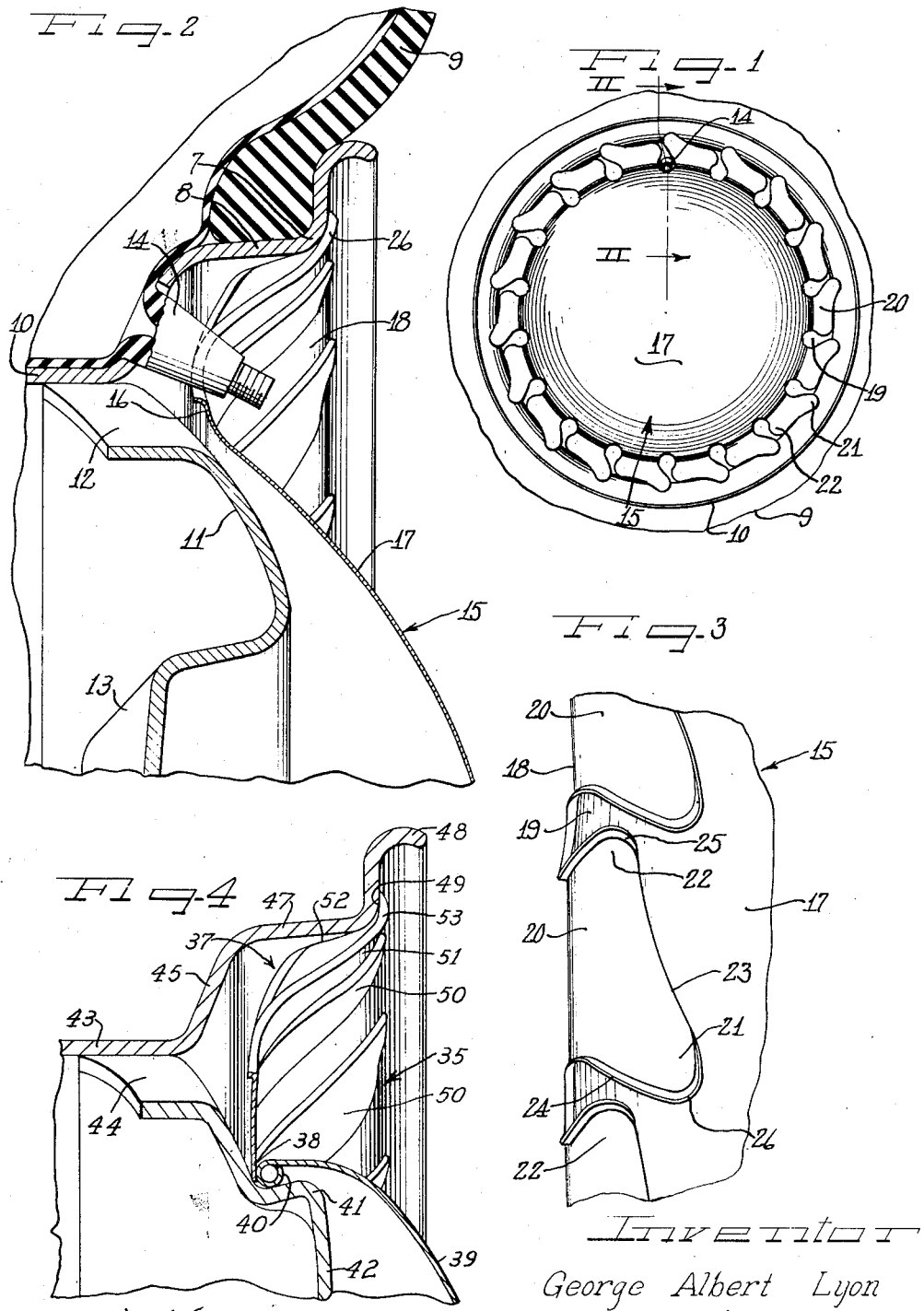
Inventor
George Albert Lyon

United States Patent Office 2,776,170
Patented Jan. 1, 1957

2,776,170

WHEEL COVER

George Albert Lyon, Detroit, Mich.

Application July 15, 1954, Serial No. 443,460

10 Claims. (Cl. 301—37)

The present application is a continuation-in-part of my application Serial No. 303,495, filed August 9, 1952, now abandoned.

This invention relates to a wheel cover and more particularly to an automobile wheel cover having retaining fingers which also serve as air vanes.

An object of this invention is to provide a modified form of wheel cover with vane-like fingers of the same general character as that disclosed in Figure 4 of my copending patent application, Serial #290,458, filed May 28, 1952, now abandoned.

Still another object of this invention is to provide a vane type wheel cover which lends itself to economical manufacture on a large production scale.

In accordance with the general features of this invention there is provided a cover structure for a wheel including flanged tire rim and body parts, a circular wheel cover therefor having a plurality of cover retaining vane-like fingers at its outer periphery, each of which fingers having circumferentially spaced ends formed by turned edges for reinforcing the fingers when in resiliently stressed engagement with the wheel.

Still another feature of the invention relates to forming each of the fingers so that it is transversely tilted with one of its ends axially outward of the other so as to permit a scooping up of air by the finger when the wheel is rotating.

Other objects and features of this invention will more fully appear from the following detailed description taken in connection with the accompanying drawing which illustrates a single embodiment thereof and in which:

Figure 1 is a fragmentary side view of a wheel having a cover of my invention applied thereto;

Figure 2 is an enlarged fragmentary cross-sectional view taken on substantially the line II—II of Figure 1;

Figure 3 is a fragmentary edge view of a portion of the cover showing the shape of one of the vane-like fingers at the peripheral margin of the cover; and Figure 4 is a fragmentary radial sectional view through a modification.

A cover according to my invention, as shown in Figures 1 to 3, is designated generally by reference character 15 and is adapted to be used on a conventional automobile wheel. Such a wheel includes the usual tire and tube assembly 9 mounted in the customary way upon a multi-flange drop center type of tire rim 10 which is in turn carried by a dished wheel body 11. The wheel body 11 is attached at spaced intervals to the base of the rim 10 and is provided with transverse openings 12 alternating with the points of attachment and through which air can circulate in the rotation of the wheel. The central part of the body part 11, as is customary, is provided with an inset flange 13 adapted to be used in fastening the wheel to a part on an axle of the vehicle as is well known in the art.

The wheel cover 15 of my invention is preferably made from very thin metallic sheet such, for example, as stainless steel which lends itself to a high lustrous finish. Also, the cover 15 lends itself to economical manufacture by being capable of formation from a punch press stamping.

The cover 15 includes a dished intermediate portion 16 defined on its sides by radially inner and outer divergent portions 17 and 18 respectively. The inner portion 17 is formed into a crown for disposition over the center of the wheel although if it is so desired it may be provided with a detachable hub cap (not shown) as is well known in the art.

The outer cover portion 18, which comprises a peripheral margin of the cover, has a plurality of generally key-shaped slots or openings 19 which form the margin 18 into an annular series of spaced vane-like segments 20 which also serve as cover retaining fingers.

Since the vane-like segments or fingers 20 are all identical in construction a description of one will suffice for all.

Each finger includes an axially outer end 21 (Figs. 1 and 3) and a trailing or axially inner end 22. In other words, each finger is inclined or tilted transversely of the cover so that it can extend into the inside of the rim flange 8.

The ends 21 and 22 of each finger are connected by a curved edge 23 adapted to have biting engagement with the rim flange 8 when the cover is pushed into the wheel for cooperation therewith.

It will be appreciated that by reason of the provision of the openings or slots 19 in the peripheral margin of the cover, the fingers are somewhat weakened. Accordingly, I propose to reinforce each of the fingers or segments 20 by providing its ends 21 and 22 with reinforced or turned edges 24 and 25 respectively.

Also each finger has its axially outer end 21 slightly enlarged and formed into a lip 26 which is adapted to engage the outer shoulder 7 of the rim flange 8 as shown in Figure 2 for centering the cover. In fact, in this embodiment of my invention, the cover is actually bottomed against the wheel only at the lip-like finger ends 26.

It will be perceived that the tire and tube assembly 9 has a customary valve stem 14 which is adapted to project through one of the holes or slots 19 in the cover as shown in Figure 1 when the cover is on the wheel.

In the application of the cover to the wheel one of the openings 19 is first aligned with the valve stem 14 and then the cover is pressed bodily inward into the wheel which brings the edges 23 of the vane-like fingers 20 into gripping engagement with the surface of rim flange 8. Inward movement of the cover is limited by the lips 26 bottoming against the shoulder 7 of rim flange 8.

When the cover is thus on the wheel the vane-like segments 20 not only serve as cover retaining fingers for the cover but in addition constitute scoop-like vanes for scooping up air in the rotation of the wheel.

When it is desired to remove the cover, the same may be easily effected by inserting a screwdriver between adjoining ends 21 and 22 of adjoining fingers 20 and by forcibly prying the cover off the wheel. This is possible due to the fact that the edges 23 of the finger-like segments 20 have resilient stressed engagement with the rim flange 8 when the cover is pressed into the wheel.

In the modification of Figure 4, the present invention is adapted to a combination trim ring and hub cap assembly on the outer side of a wheel. To this end, a cover assembly 35 is provided in which a trim ring 37 has an inner marginal flange 38 which is adapted to be disposed in association with a hub cap 39 provided with a resilient marginal retaining bead 40 engageable with generally radially outwardly facing retaining bumps 41 formed on a wheel body 42, and embodying the principles of the invention covered in my Patent No. 2,445,330, issued July 20, 1948.

The wheel body 42 is devised to support a tire rim 43 and wheel openings 44 are preferably provided between the wheel body and the tire rim. A side flange 45 extends from the base of the tire rim and merges with an intermediate generally axially outwardly directed intermediate flange 47 merging with a terminal flange 48. At juncture of the intermediate and terminal flanges a shoulder 49 is provided.

The trim ring 37 is dimensioned to substantially overlie the tire rim and the juncture of the tire rim with the wheel body and the portion of the wheel body between the margin of the hub cap and the tire rim-body juncture. At its outer margin, the trim ring 37 is provided with air vane and retaining fingers 50 which in all essential respects are like the vane-finger segments 20 of the cover of Figures 1 to 3. That is, the fingers 50 are formed by providing the margin of the cover with slots 51 similarly as the holes or slots 19 of the cover 15, while biting edges 52 engage the intermediate flange 47 and turned flanged edges 53 bottom against the shoulder 49, all in the same manner as the similar elements of the fingers 20.

The trim ring 37 thus is a self-retaining trim ring that will remain on the wheel when the hub cap 39 is removed, but if desired the trim ring 37 can be removed from the wheel by prying the fingers 50 from the tire rim, similarly as described in connection with the cover 15.

It will be understood that modifications and variations may be effected without departing from the scope of the novel concepts of the present invention.

I claim as my invention:

1. In a wheel structure including a wheel having flanged tire rim and body parts, a circular wheel cover having a radially outer peripheral margin provided with a plurality of spaced generally radial slots which form said margin into spaced radial vane-like segments, each of said segments being transversely inclined so that it has an axially outer end for engagement with an outer surface of the rim flange and an axially inner end for disposition inside the rim flange and connected to said outer end by an edge for resilient cover retaining engagement with a surface of the rim flange, said segment ends having turned edges for reinforcing each segment as the same is resiliently stressed by engagement with the rim flange surface.

2. In a wheel structure including a wheel having flanged tire rim and body parts, a circular wheel cover having a radially outer peripheral margin provided with a plurality of spaced generally radial slots which form said margin into spaced radial vane-like segments, each of said segments being transversely inclined so that it has an axially outer end for engagement with an outer surface of the rim flange and an axially inner end for disposition inside the rim flange and connected to said outer end by an edge for resilient cover retaining engagement with a surface of the rim flange, said segment ends having turned edges for reinforcing each segment as the same is resiliently stressed by engagement with the rim flange surface, each of said outer segment ends being also formed into a lip for bottoming against an outer surface of the rim flange and for assisting in centering the cover on the wheel.

3. In a wheel structure including a wheel body and a tire rim and with air circulation openings through the wheel, a cover for disposition at the outer side of the wheel, comprising a cover body having a marginal generally radially projecting series of vanes extending peripherally of the cover and being transversely inclined so that the side edges of adjacent vanes are relatively axially spaced, the spaces between the side edges of the vanes providing substantial air gaps for circulation of air through the cover, the radially projecting end margins of the vanes having means for retaining engagement with a flange of the wheel, and marginal reinforcing flanges on said vanes.

4. In a wheel structure including a wheel having flanged tire rim and body parts, a circular wheel cover having a radially outer peripheral margin provided with a plurality of spaced generally radial slots which form said margin into spaced radial vane-like segments, each of said segments being transversely inclined so that it has an axially outer end for engagement with an outer surface of the rim flange and an axially inner end for disposition inside the rim flange and connected to said outer end by an edge for resilient cover retaining engagement with a surface of the rim flange, and reinforcing means on the margins of said vanes for increasing the resilience of the vanes.

5. In a wheel structure including a generally axially extending and radially facing annular flange, a cover for disposition at the outer side of the wheel and including a cover body having generally axially inwardly and radially extending retaining wing flanges spaced apart circumferentially of the cover, said wing flanges being resiliently flexible and having generally radially facing end edges disposed in respective planes tilted to extend generally axially across the perimeter defined by said wheel flange and retainingly engageable in wedging radially thrusting resiliently tensioned relation against the wheel flange by pressing the cover axially inwardly into position on the wheel, and said edges being releasable from said retaining engagement with the wheel flange in response to axially outward pry-off force to cause the edges to slide axially outwardly along said wheel flange, and reinforcing means on the margins of said wing flanges for increasing the resistance to resilient deflection of the wing flanges.

6. In a wheel structure including a wheel body having a hub cap applied thereto and a tire rim supported by the wheel body, a cover ring for substantially overlying the tire rim and the wheel body between the hub cap and the tire rim, said cover ring having a series of air circulation promoting and cover retaining vanes tilted transversely of the cover and engageable retainingly with a flange of the tire rim for thereby holding the ring cover member on the wheel independently of the hub cap.

7. In a wheel structure including a wheel body having a hub cap applied thereto and a tire rim supported by the wheel body, a cover ring for substantially overlying the tire rim and the wheel body between the hub cap and the tire rim, said cover ring having a series of air circulation promoting and cover retaining vanes transversely of the cover and engageable retainingly with a flange of the tire rim for thereby holding the ring cover member on the wheel independently of the hub cap, said retaining ring vanes having substantial openings therebetween to enable air circulation therebetween.

8. In a wheel structure including a flanged tire rim and a body part, a circular wheel cover for disposition over the outer side of the wheel and having axially inner and outer sides and a plurality of cover retaining vane-like fingers thereon tilted transversely of the cover and projecting generally axially outwardly and radially for retaining endwise tensioned engagement with a flange of the tire rim, said fingers having marginal reinforcing means to increase the resilient tensioned resistance to deformation incident to the tensioned engagement thereof with the rim flange.

9. In a wheel structure including a flanged tire rim and a body part, a circular wheel cover for disposition over the outer side of the wheel and having axially inner and outer sides and a plurality of cover retaining vane-like fingers thereon tilted transversely of the cover and projecting generally axially outwardly and radially for retaining endwise tensioned engagement with a flange of the tire rim, said fingers having marginal reinforcing means to increase the resilient tensioned resistance to deformation incident to the tensioned engagement thereof with the rim flange, said marginal reinforcing means comprising inwardly turned marginal flanges.

10. In a wheel structure including rim and body parts with one of said parts having an annular generally radially facing flange, a circular cover member for disposition over the outer side of the wheel having a marginal portion for disposition in general opposition to said wheel flange and provided with an annular series of generally radially extending finger vanes of substantial width tilted transversely of the cover member and projecting therefrom for tensioned gripping endwise retaining engagement with said wheel flange, the margins of the finger vanes being reinforced for enhancing the resiliency of the finger vanes and the sides of the vanes being relatively axially offset so as to afford air circulation openings therebetween.

References Cited in the file of this patent

UNITED STATES PATENTS

| 2,094,326 | Lyon | Sept. 28, 1937 |

FOREIGN PATENTS

| 7,862 | Australia | June 20, 1927 |
| 787,597 | France | Sept. 25, 1935 |